(12) United States Patent
Rupp

(10) Patent No.: US 6,464,588 B1
(45) Date of Patent: Oct. 15, 2002

(54) FLEXIBLE SHAFT WITH HELICAL SQUARE END

(75) Inventor: Glenn A. Rupp, Highland Lakes, NJ (US)

(73) Assignee: S. S. White Technologies Inc., Piscataway, NJ (US)

( * ) Notice: Subject to any disclaimer, the term of this patent is extended or adjusted under 35 U.S.C. 154(b) by 0 days.

(21) Appl. No.: 09/652,103

(22) Filed: Aug. 30, 2000

(51) Int. Cl.$^7$ .................................................. F16C 1/08
(52) U.S. Cl. .......................................... 464/58; 464/179
(58) Field of Search ............................... 464/52, 53, 57, 464/58, 59, 60, 179; 403/229, 314, 358, 383; 72/76; 74/12, 500.5, 502.5; 411/394, 453, 454

(56) References Cited

U.S. PATENT DOCUMENTS

| | | | |
|---|---|---|---|
| 339,646 A | * 4/1886 | Hallidie | 464/58 X |
| 571,869 A | 11/1896 | Stow | |
| 718,934 A | * 1/1903 | Imlay | 411/454 |
| 1,247,178 A | * 11/1917 | Sweeney | 411/454 |
| 1,649,310 A | * 11/1927 | Joline | 464/58 |
| 1,905,197 A | 4/1933 | Webb | |
| 1,952,301 A | 3/1934 | Webb | |
| 1,995,420 A | * 3/1935 | Fischer | 464/58 |
| 2,142,497 A | 1/1939 | Clendenin | |
| 2,255,234 A | * 9/1941 | Uhler | 464/58 |
| 2,401,100 A | 5/1946 | Pile | |
| 2,875,597 A | 3/1959 | Neubauer | |
| 3,274,846 A | 9/1966 | Forster | |
| 3,481,156 A | * 12/1969 | De Csipkes | 464/57 X |
| 3,839,882 A | * 10/1974 | Gilarski, Jr. | 74/12 X |
| 4,112,708 A | 9/1978 | Fukuda | |
| 4,344,304 A | 8/1982 | Eiche | |
| 4,541,160 A | * 9/1985 | Roberts | 464/52 X |
| 5,288,270 A | 2/1994 | Ishikawa | |
| 5,621,842 A | * 4/1997 | Keller | |
| 5,687,482 A | * 11/1997 | Behrendt | 56/295 X |
| 6,215,932 B1 | * 4/2001 | Hardwick, III et al. | |
| 6,309,019 B1 | 8/2001 | Downey et al. | |
| 6,317,542 B1 | * 11/2001 | Hardwick, III et al. | |

FOREIGN PATENT DOCUMENTS

| | | | |
|---|---|---|---|
| DE | 129248 | * 3/1902 | 464/52 |
| DE | 3511-534 | * 10/1986 | 464/52 |

* cited by examiner

*Primary Examiner*—Greg Binda
(74) *Attorney, Agent, or Firm*—Arthur L. Lessler

(57) ABSTRACT

A flexible shaft having at least one end formed to have a helical square shape, wherein successive cross-sections have square shapes progressively rotated with respect to each other. The overall rotation from where the square cross-section begins to the adjacent end of the shaft is preferably in the range of 10 to 20 degrees. The helical square end is preferably shaped by swaging utilizing helical square dies preferably made by electron discharge machining. When the helical square end of the flexible shaft is forced into a mating square opening of an end fitting, the helical square configuration of the shaft end causes it to be deformed and bind tightly in the fitting with an interference fit, thus reducing vibration and noise when the shaft is rotated. Instead of a helical square shape, the end of the flexible shaft may alternatively have another helical polygonal shape.

10 Claims, 1 Drawing Sheet

FLEXIBLE SHAFT WITH HELICAL SQUARE END

BACKGROUND OF THE INVENTION

This invention relates to an improved flexible shaft for transmitting torque.

A shaft used for transmitting torque, including a flexible shaft, frequently has square or other polygonal end parts, each end part being adapted to be received in a square or other polygonal cavity of a corresponding fitting. However, when such a shaft is rotated, play between the outside of the end part and the inside of the cavity fitting causes undesirable noise and vibration. In the case of a flexible shaft, the noise and vibration is accentuated due to flexing of the shaft as it is rotated.

Various arrangements have been proposed for coupling the shaft end part to the adjacent fitting cavity so as to reduce noise and vibration. See, for example, U.S. Pat. No. 4,344,304 to Eiche entitled Coupling For Mandrels Or The Like. However, such arrangements are relatively complicated and costly, and are not well suited to use with flexible shafts.

The assignee of the present application had believed that imparting a twist to the end of a flexible shaft would improve its noise and vibration characteristics. However, despite efforts by employees of the assignee and an independent consultant retained by the assignee, extending over a period of several years, prior to the invention described herein the efforts to produce such a shaft were not successful.

Accordingly, an object of the present invention is to provide a flexible shaft having an improved arrangement for coupling an end part of the shaft to a fitting.

SUMMARY OF THE INVENTION

As herein described, there is provided a flexible shaft having at least one end portion formed to have a helical noncircular shape. While any shape of noncircular cross-section may be used, a polygonal cross-sectional shape is preferred; a square cross-sectional shape being desirable, particularly in view of the large number of existing fittings having cavities of square cross-section.

When an end part of the helical noncircular end portion of the shaft is inserted into the cavity of the fitting, the helical end portion rotates, resulting in an interference fit between the end part and the fitting. This interference fit tightly retains the end part of the shaft within the cavity, resulting in reduced noise and vibration when the shaft is rotated.

The helical noncircular end portion of the flexible shaft is preferably formed by swaging, utilizing a die set having the desired helical noncircular configuration.

IN THE DRAWING

DETAILED DESCRIPTION

Figure 1:
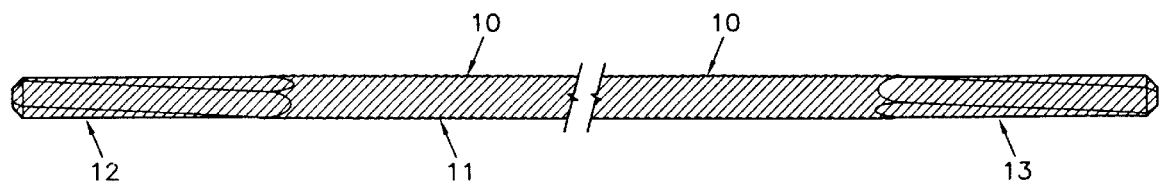
FIG. 1 is an isometric view of a flexible shaft according to a preferred embodiment of the invention.

FIG. 1 shows a flexible shaft 10 which, except for the configuration of its end portions, is similar to prior art flexible shafts.

That is, the shaft 10 comprises a central or mandrel wire upon which one or more layers of wire are wound. See, for example, U.S. Pat. No. 571,869 to Stow; U.S. Pat. No. 1,905,197 to Webb; U.S. Pat. No. 1,952,301 to Webb; U.S. Pat. No. 2,142,497 to Clendenin; U.S. Pat. No. 2,401,100 to Pile; U.S. Pat. No. 2,875,597 to Neubauer; U.S. Pat. No. 3,274,846 to Forster; U.S. Pat. No. 4,112,708 to Fukuda; and U.S. Pat. No. 5,288,270 to Ishikawa.

The flexible shaft 10 has an outer wire layer 11 helically wound on the mandrel wire or the next inner layer of wire, a left end portion 12, and a right end portion 13.

As best seen in FIGS. 2 through 5, the left end portion 12 of the shaft 10 is formed to a helical square shape, and the individual turns 15 etc. of the layer 11 are correspondingly shaped. That is, while each individual cross-section of the shaft 10 in the portion 12 thereof is square, successive cross-sections are rotated in the same direction with respect to each other, so that the adjacent corners of those cross-sections describe four parallel helical paths.

While the direction of the helical paths may be either clockwise or counterclockwise as viewed from the left end 16 of the shaft 10, the direction of said paths should preferably be such that the interference which occurs when an end part of the portion 12 is forced into a fitting tends to tighten rather than loosen the turns 15 etc. of the outer winding 11. For the shaft 10 as shown in the drawing, this means that the helical paths should turn in a clockwise direction as viewed from the end 16, and in a counterclockwise direction as viewed from the other end of the shaft.

The preferred pitch of the helical paths is dependent on the length of the end part 17 (FIG. 6) of the end portion 12 of the shaft which is to engage a corresponding square cavity, such as the cavity 18 of the fitting 19. For most applications, a helical angle $\alpha$ (FIG. 3) in the range of 10° to 20° will be suitable; said angle being 15° in the preferred embodiment.

Figure 2:
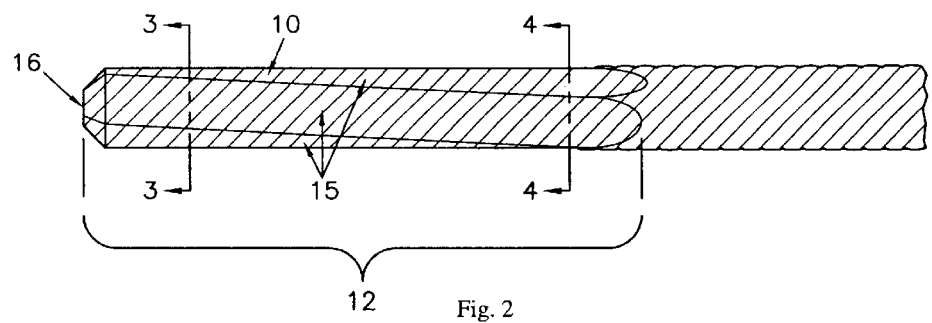
FIG. 2 is an enlarged front elevation view of part of the shaft shown in FIG. 1, including the left end portion thereof.
Figure 3:
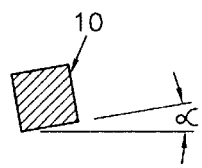
FIG. 3 is a cross-sectional view of the shaft shown in FIG. 2, taken along the cutting plane 3—3.
Figure 4:
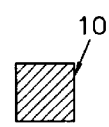
FIG. 4 is a cross-sectional view of the shaft shown in FIG. 2, taken along the cutting plane 4—4.
Figure 5:
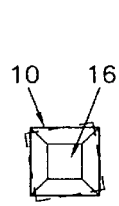
FIG. 5 is a left side view of the shaft shown in FIG. 2.
Figure 6:
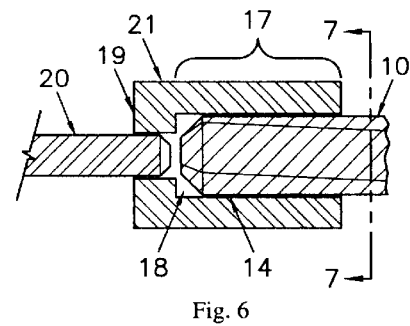
FIG. 6 is a front cross-sectional view of an assembly comprising a shaft fitting with the end part of the left end portion of the shaft shown in FIG. 2 disposed therein.
Figure 7:
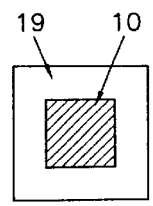
FIG. 7 is a right side view of the assembly shown in FIG. 6, taken along the cutting plane 7—7.

As seen in FIG. 6, the fitting 19 has a rotatable shaft portion 20 and a body portion 21 having a cavity 18 therein of square cross-section very slightly larger than the square cross-section of the end part of the shaft 10, as measured at the cutting plane 3—3 shown in FIG. 2.

While a square cross-section is preferred, the end portion 12 may have another polygonal cross-section or any other noncircular cross-section—with the cavity 18 of the fitting 19 having a cross-section such as to accommodate the end part 17 of the flexible shaft.

Referring to FIG. 6, when the end part 17 is forced into the cavity 18 of the fitting 19, the helical configuration of the end part causes it to have a tendency to turn within the cavity. However, the engagement of the square cross-section of the end part with the square cross-section of the cavity prevents such turning, resulting in torsional compression of the end part and an interference fit between the end part and the cavity wall 14 which tightly engages the end part with the fitting. As a result, when the shaft and fitting rotate, with one driving the other, there is little or no relative movement between them, resulting in reduced noise and vibration compared to prior art flexible shaft and fitting arrangements.

The end portions 12 and 13 are preferably formed by swaging, utilizing a die set preferably comprising four dies (each for forming one of the four surfaces of the helical square configuration) installed in a swaging machine of standard design, such as the Finn Power P20, manufactured by Lillbacka Power Company, or an equivalent machine.

Each die is preferably made from tool steel by wire electron discharge machining, according to the following procedure:

1. Design and build an accurate work holding device (clamping fixture) that will set and hold the die block forming surface at an angle perpendicular to the positioning base of a wire electronic discharge machine ("wire EDM"). A suitable wire EDM machine is the Sodick 320 AWT.

Instead of utilizing a wire EDM machine to shape the helical configuration in the die block forming surface, that configuration can be generated using a multi-axis controlled path abrasive grinder with interpolating axes, such as a Huffman HS 155R grinder.

2. Determine the required helix angle of the die, corresponding to the desired rotation angle of the helical path of the shaft end portion from the beginning of the end portion of the shaft to the adjacent shaft end.
3. Make a drawing showing the configuration of the die.
4. Mount a tool steel blank in the work holding device and adjust or position the device so that the electrically charged wire of the wire EDM makes contact with the blank. Then determine the origin or starting points for the x, y and z axes of the wire EDM.
5. Calculate the offset angles that are required for the x and y axes to interpolate in order to generate the required helical path.
6. Enter the desired cutting parameters into the wire EDM controller. These parameters depend upon the material to be cut, the length and width of the material, the desired helical angle, the charged wire used by the machine to erode the blank, the speed and feed of the wire, and the desired surface finish of the die (which will determine the number of wire passes).
7. Make the cut on one dies section using the aforementioned cutting parameters.
8. Verify the die configuration by measuring the helical angle utilizing an optical profile projector and/or a toolmaker's microscope with digital readouts. If the die complies with the drawing, complete the same machining process on the remaining three dies of the die set, and test the dies on a flexible shaft in a swaging press to validate the process.

The same process may be used to manufacture a die set for providing a flexible shaft end portion with another polygonal configuration, in which case the die set preferably comprises as many dies as there are polygon sides, i.e. a separate die for each surface of the polygonal configuration.

The swaging process for forming the end portion 12 utilizing the aforementioned set of four dies, is as follows:

1. Open the die block holder of a Finn Power P20 or equivalent swaging machine by rotating the retraction dial.
2. Lubricate the die-retaining ring of the machine with grease.
3. Insert the four dies into the master ring, using the die insertion tool accompanying the machine.
4. Retract the dies slowly by rotating the retraction dial and the swaging dial, leaving minimal clearance for the end portion of the flexible shaft to pass through the opening between the dies.
5. Guide the flexible shaft into the space between the dies and adjust the amount of die retraction by rotating the swage control dial until the desired square configuration is formed.
6. Adjust the flash cutter of the swaging machine to cut the formed shaft to the proper length.
7. Set the proper gap spacing of the flash cutter electrode and align the electrode for the desired crimp position.
8. Set the arc, power, heat, firing delay, and stretch delay dials of the swaging machine to the required parameters for cutting the formed shaft to length.
9. Verify the following features of the formed end portion of the flexible shaft and make any necessary adjustments to obtain the desired configuration: size of helical square across corners and flats; helical angle; total shaft length.
10. Deburr the formed flexible shaft.

I claim:

1. A flexible shaft comprising at least one layer of wire wound on another wire or wires and having at least one end portion wherein the wires are formed so that the outer layer of wire has a helical noncircular shape, and a fitting having a cavity with a cross-section different from the cross-section of at least a part of said end portion, an end part of said end portion being disposed within said cavity and having an interference fit therewith.

2. The flexible shaft according to claim 1, wherein the cross-sectional shape of said end portion is polygonal.

3. The flexible shaft according to claim 1 or 2, wherein said end portion has four sides and the cross-sectional shape of said end portion is square.

4. A flexible shaft comprising at least one layer of wire wound on another wire or wires, said shaft having at least one end portion with a helical square configuration, wherein the angle of helical rotation from where the square cross-section begins to the adjacent end of the shaft is in the range of 10 to 20 degrees.

5. A flexible shaft comprising at least one layer of wire wound on another wire or wires, said shaft having at least one end portion with a helical square configuration, wherein successive cross-sections of said end portion have square shapes of substantially identical cross-section progressively rotated with respect to each other, and the angle of rotation from where the square cross-section begins to the adjacent end of the shaft is in the range of 10 to 20 degrees.

6. A flexible shaft comprising at least two contiguous layers of wire wound on a mandrel wire, at least one end portion of said shaft having a helical square configuration, the end of said shaft adjacent said end portion being rotated by an angle in the range of 10 to 20 degrees with respect to the part of said shaft where said end portion begins.

7. A flexible shaft comprising at least one layer of wire wound on another wire or wires and having at least one end portion formed to have a helical polygonal shape, the angle of helical rotation from where the polygonal shape begins to the adjacent end of the shaft being in the range of 10 to 20 degrees.

8. A flexible shaft comprising at least one layer of wire wound on another wire or wires and having at least one end portion formed to have a helical polygonal shape, successive cross-sections of said end portion having polygonal shapes progressively rotated with respect to each other, the angle of rotation from where the polygonal cross-sections begin to the adjacent end of the shaft being in the range of 10 to 20 degrees.

9. A flexible shaft comprising at least one layer of wire wound on another wire or wires and having at least one end portion formed to have a helical noncircular shape, wherein the helical angle of rotation from where the noncircular cross-section begins to the adjacent end of the shaft is in the range of 10 to 20 degrees.

10. A flexible shaft comprising at least one layer of wire wound on another wire or wires and having at least one end portion formed to have a helical noncircular shape, wherein successive cross-sections of said end portion have noncircular shapes progressively rotated with respect to each other, the angle of rotation from where the noncircular cross-section begins to the adjacent end of the shaft being in the range of 10 to 20 degrees.

* * * * *